United States Patent [19]
Snitzer

[11] Patent Number: 4,780,877
[45] Date of Patent: Oct. 25, 1988

[54] OPTICAL FIBER LASER

[75] Inventor: Elias Snitzer, Wellesley, Mass.

[73] Assignee: Polaroid Corporation, Cambridge, Mass.

[21] Appl. No.: 835,626

[22] Filed: Mar. 3, 1986

Related U.S. Application Data

[63] Continuation-in-part of Ser. No. 759,281, Jul. 26, 1985.

[51] Int. Cl.⁴ .................. H03M 13/00; H04L 1/08; G02B 6/02; G02B 6/32
[52] U.S. Cl. .......................................... 372/6; 372/69; 372/71; 350/96.29; 350/96.34; 350/96.18
[58] Field of Search .................. 372/6, 71, 69, 20; 350/96.15, 96.29, 96.30, 96.34, 96.18

[56] References Cited

U.S. PATENT DOCUMENTS

| | | | |
|---|---|---|---|
| 3,894,857 | 7/1975 | Uchida et al. | 350/96.34 |
| 4,015,217 | 3/1977 | Snitzer | 372/6 |
| 4,040,890 | 8/1977 | Burrus, Jr. et al. | 156/605 |
| 4,044,315 | 8/1977 | Snitzer | 331/94.5 |
| 4,383,318 | 5/1983 | Barry et al. | 372/6 |
| 4,616,901 | 10/1986 | MacChesney | 350/96.34 |

OTHER PUBLICATIONS

Gaprindashvili et al., Properties of an Actived Glass Fiber in an Amplification System, vol. 78, 1973, Chemical Abstracts, p. 461.

"Glass Lasers", Elias Snitzer, Applied Optics, vol. 5, No. 10, Oct. 1966.

Primary Examiner—Eugene R. Laroche
Assistant Examiner—Michael Shingleton
Attorney, Agent, or Firm—Francis J. Caufield

[57] ABSTRACT

An optical fiber laser comprising a gain cavity in the form of a single mode optical fiber with integrally formed dichroic mirror end sections to provide feedback. The fiber core comprises a host material of silicate glass preferably doped with 0.01 to 1 weight percent of just erbium oxide as a lasing medium. The laser is end pumped at approximately 1.49 micrometers with a laser diode, preferably InGaAsP, and has an output at 1.54 micrometers.

5 Claims, 2 Drawing Sheets

OPTICAL FIBER LASER

CROSS-REFERENCE TO RELATED APPLICATION

This is a continuation-in-part of application Ser. No. 759,281, filed Jul. 26, 1985.

BACKGROUND OF THE INVENTION

This invention in general relates to optical radiation sources and in particular to improvements in lasers suitable for use in optical communication systems.

Communication by means of optical electromagnetic radiation transmitted along optical fibers is now a well-established practice made possible by the development over the past 25 years of reliable, coherent sources, low-loss optical transmission fibers, and suitable detectors. Motivating this rapid progress was the proposal of the optical maser by A. L. Schawlow and C. H. Townes in 1958 and the subsequent announcement by T. H. Maiman in 1960 of its actual reduction to practice with laser action in ruby. With the achievement of the coherent, or quasi coherent, source came the recognition that the efficient transmission of radiation from laser sources along glass optical fibers of suitably low attenuation could provide communication systems which offered significant advantages over metallic cables, the most important of which were dramatically higher information carrying capacities over greater distances without repeaters. In addition, compactness and substantially reduced weight, along with lower manufacturing and installation costs, were also incentives adding impetus to this progress to the point where now systems are under consideration for installation in the field which are approaching the theoretical limit for signal detection and information per optical bandwidth.

The higher information capacity of optical systems exists because a communication channel requires the same bandwidth regardless of the region of the spectrum in which it is located, and the higher-frequency regions, the optical regions, have far more room for channels and consequently have a much greater potential capacity than the lower competitive frequencies. To fully exploit this capacity in an economic way, however, places certain requirements on optical sources for use in such systems.

The basic characteristics for a light source for use in communications applications, and those which govern achievable system performance, include the source spectral emission, power output, physical size, power efficiency, life, coherence, cost, and modulatability.

Source spectral emission must complement the optical fiber attenuation and dispersion properties if efficient use of source power is to be made. Attenuation characteristics of optical fiber waveguides varies as a function of wavelength, generally decreasing with increasing wavelength. Regions from 0.8 to 1.6 micrometers have attractive low-loss transmission. At the shorter wavelength end, loss is sufficiently low for many applications, but where maximum distance is to be covered between repeaters, except for the water absorption band near 1.40 micrometers, the longer spectral region from 1.2 to 1.6 micrometers is more suitable.

Source spectral width is also an important consideration since the refractive index of fiber material also varies with wavelength. This latter property, known as material dispersion, causes a pulse spreading which reduces the data rate capacity of the fiber, and the pulse spreading is more severe with spectrally wider sources than with narrower ones. Consequently, it is important that the spectral width of the source be as narrow as possible to be consistant with high data rate transmission. Inasmuch as the spectral emission characteristics of the source vary with temperature, it is important to keep in mind how these changes occur and to provide appropriate temperature control where necessary for the application in mind.

In wavelength division multiplexing applications, it is important that the width of the spectral emission of the source be made as narrow as possible in order to achieve a high density of multiplexing. For wavelength multiplexing, the line width and its shape directy influence cross-talk levels. A set of sources with narrow emission spectra form a set of non-overlapping spectral sources can be used effectively over a wavelength interval of a few tens of nanometers to achieve wavelength multiplexing. If these sources have wider emission spectrum than the overlapping criterion would allow, selective filters may be used.

In general then, the source spectral output should be in a region where fiber attenuation is low and should be of narrow bandwidth to minimize dispersion effects and maximize both channel density and bandwidth, all while being very stable.

High signal power output is generally desirable because with higher power more attenuation can be tolerated before signal power level falls below a level for satisfactory detection. In addition, the power output distribution should be such that efficient coupling to the fiber is possible given its diameter and numerical aperture. At the other extreme, the power should not be so high as to exceed the material linearity limits unless for some special purpose that is intended.

Physical size is a consideration, and the source should be generally small and compact for convenience of handling and weight and space considerations. Although physical size is of importance, it is equally important to be able to efficiently couple the source output into the fiber core.

The power efficiency of the source determines how much input power is required of the pump and, hence, also the heat dissipation requirements. Poor efficiency means higher input power requirements for given optical power output. This can present power supply problems for remotely located equipment. Inefficiently converted source energy also results in excessive heating, requiring appropriate heat dissipation arrangements otherwise unnecessary.

Reliability is of considerable importance, particularly where the optical source is to be used as one of a group in a system. Here both absolute life and mean time between failures (MTBF) are important parameters because they directly influence the reliability of the system overall. Absolute life for most applications is about 100,000 hours while for system applications a satisfactory MTBF is on the order of 10,000 hours or better.

Coherence is an important property of sources. The temporal coherence of a wave reflects the narrowness of the frequency spectrum and the degree of regularity of the wave train. Completely coherent light is equivalent to a single-frequency wave train with a frequency spectrum that can be expressed by only a single, monochromatic line. On the other hand, a wave with several frequency components, or a wave that consists of superimposed random short wave trains is said to be partially coherent. In practice, it is extremely difficult to achieve a completely coherent wave. Since maximum bandwidth depends on spectral width, it is important for the source temporal coherence to be as good as possible consistent with the objectives of the system.

Cost is a comparative requirement, but it should not be so high that it overly burdens the overall system cost on a comparative basis with competitive systems and should take into consideration not only the cost of the basic device, but any equipment cost associated with the operation of the device itself.

Carrier waves provided by optical sources, like other carrier waves, have information imposed on them through the process of modulation. That is, some optical property of the carrier wave is modified in correspondence with a coding scheme, and the information is subsequently extracted from the carrier wave by suitable encoding techniques. If the output of the source is relatively incoherent, it is difficult to achieve phase and frequency modulation, but intensity modulation in analog and digital form is readily implemented and extensively used.

Modulation can be either within the laser oscillation or external to the oscillator. With an internal modulator, the output of the carrier source, such as a semiconductor laser, is made to vary in accordance with changes in the injection current which typically serves as the electrical analog of the information signal. External modulators accept a source output as an input and then change some property of the source output for transmission along the fiber trunk line.

The rate of modulation is determined by the speed of the drive circuits and the response time constants of the source or external modulator as the case may be. The faster the response time, the wider the bandwidth signal to be handled.

Those skilled in the art have developed a variety of sources which satisfy the above requirements, some more perfectly than others depending on detailed differences, but all share in common fundamental ideas of operation.

For lasing optical sources, the conditions for laser oscillation in the visible and infrared regions of the spectrum are well understood. Fundamentally, these require that the laser material be capable of fluorescing and that an inversion in population take place between two different energy levels between which the fluorescent emission takes place. There is also the requirement that there be a fairly strong absorption of the pumping energy to permit pumping action by the light source. In addition, feedback is required through the resonant cavity containing the laserable material.

The ruby laser demonstrated by Maiman in 1960 was single-crystal aluminum oxide "doped" with chromium impurities. During the intervening years, several crystalline or glass systems with impurity ions as, for example, glass doped with neodymium or other rare earth ions, have been developed.

A large number of gas lasers with outputs in the range from the far IR to the UV are known. Important among these are helium-neon, argon, and krypton as well as several molecular gas systems such as carbon dioxide and carbon monoxide.

Solid state semiconductor lasers are known where the electron current flowing across a junction between P- and N-type material produces extra electrons in a conduction band. These radiate upon their making a transition back to the valence band or lower-energy states. If the junction current is large enough, there will be more electrons near the edge of the conduction band than there are at the edge of the valence band and a population inversion may occur.

Aside from the basic known material systems and structures, lasers in the form of optical fibers in which the lasing material has been incorporated into the core have been proposed as, for example, in U.S. Pat. No. 3,958,188 entitled "Fiber Distributed Feedback Laser" issued to James C. Fletcher et al on May 18, 1976 and in my own prior work as disclosed in U.S. Pat. No. 4,044,315 entitled "Means for Producing and Amplifying Optical Energy" issued to me on Aug. 23, 1977.

In spite of the many innovations made in the laser art, improved laser structures are still required and can be usefully employed in optical fiber communication systems and in other systems, as well, for a variety of applications. Accordingly, it is a primary object of the present invention to provide an improved laser structure.

It is another object of the present invention to provide an improved laser structure having a high optical efficiency.

It is yet another object of the present invention to provide an improved laser structure having a narrow output bandwidth at 1.54 micrometers more or less.

Other objects of the invention will, in part, be obvious and will, in part, appear hereinafter. The invention accordingly comprises the structure exemplified in the detailed disclosure which follows.

SUMMARY OF THE INVENTION

This invention generally relates to optical sources and specifically to improvements in lasers particularly suitable for use in optical communications systems requiring high channel density and data transmission rates.

The laser of the invention comprises an optical gain cavity in the form of a single mode optical fiber in which the laser gain material, erbium oxide, is present in the fiber core, which is preferably a host of silicate glass. Phosphate glasses are also suitable. The preferred concentration of erbium is within the range including 0.01 to 1 weight percent, but can be as high as 5 percent.

Integrally formed on each end of the optical fiber gain cavity are dichroic filters which operate to provide feedback for lasing action and to permit end pumping.

Pump power is suppled by a laser diode and is preferably end coupled into the laser core via bulk optics through one of three dichroic filters. The laser diode is preferably of InGaAsP with an output wavelength of approximately 1.49 micrometers and the laser has an output at 1.54 micrometers in the low attenuation region of optical communication fiber. Laser diodes emitting in the region from 1.45 to 1.53 micrometers are suitable. Efficient absorption of pump power, with a low threshold for laser oscillation, is assured by adjusting the laser cavity length and erbium ion concentration so that the pump power is attenuated by about a factor of two in travelling one length of the gain cavity.

BRIEF DESCRIPTION OF THE DRAWINGS

The novel features that are considered characteristic of the invention are set forth with particularity in the appended claims. The invention itself, however, including its organization, material structure, and method of operation, together with other objects and advantages thereof, will best be understood from the following detailed description when read in connection with the accompanying drawings wherein the same number has been used to denote a part wherever it appears in the figures and wherein:

DETAILED DESCRIPTION

The inventive optical fiber laser is one which is highly stable and has a narrow single line output in the region of the spectrum where communication optical fiber is low in attenuation.

Figure 1:
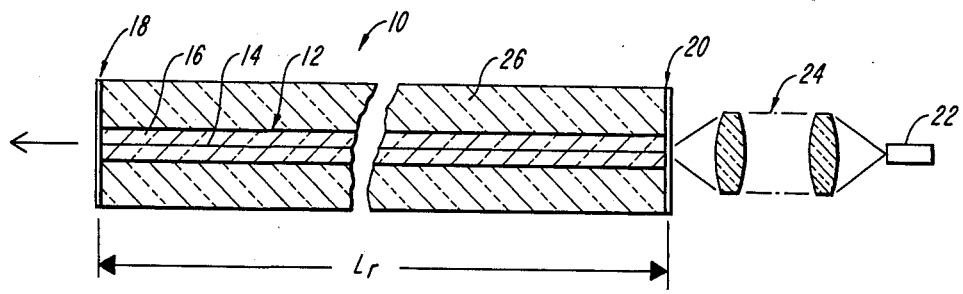
FIG. 1 is a diagrammatic elevation of the laser system of the invention.
Figure 2:
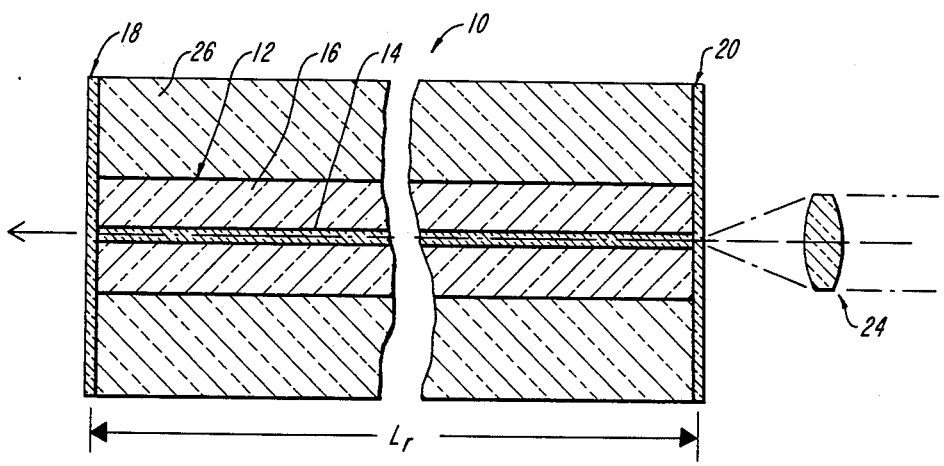
FIG. 2 is an enlarged diagrammatic elevation of the laser system shown in FIG. 1 with certain parts shown in greater detail.

The desirable characteristics of the inventive laser are achieved through the use of a combination of functional elements and a material system which may best be understood by now referring to FIG. 1 where the inventive laser is designated generally as 10.

The major components of laser 10 are a gain cavity in the form of a single mode optical fiber 12 which comprises a core 14 surrounded by a cladding 16. At the left end of optical fiber 12 is a dichroic filter 18, and at its right end another dichroic filter 20, both of which are integrally formed with the optical fiber 12. Either, or both, end dichroic end reflectors can be replaced by more strongly frequency selective reflectors, or dispersive reflectors, to limit the wavelength interval over which laser action occurs. Energy from a pump source in the form of a laser diode 22 is preferably coupled into the end of the fiber core 14 through the dichroic filter 20 by way of a bulk optical arrangement designated generally at 24.

The laser optical fiber cavity 12 is structured to propagate just single mode over the desired output to eliminate the effects of modal dispersion known to reduce data transmission rates. To make the fiber 12 propagate single mode, its geometry and material parameters are selected to satisfy the well-known relation:

$$2\pi a/\lambda(n_1^2-n_2^2)^{1/2} < 2.405$$

where a=core radius, $\lambda$ is the wavelength, $n_1$ and $n_2$ are the core and cladding indices of refraction, respectively, and 2.405 is a constant whose value is the $0^{th}$ order Bessel function at the first root. Since the wavelength region of most interest is in the near infrared where optical fiber transmission attenuation is smallest, the diameter of the core is on the order of a few microns, more or less, while that of the cladding can be conveniently made larger and will be on the order of say, 80 to 100 micrometers, more or less. In addition, the geometry of core 14 and cladding 16 can be non-circular and still be single mode propagating, but if it is of non-circular geometry, the previous equation is only approximately true and is to be applied accordingly.

Having assured that the core 14 propagates only single mode, it is provided with an effective length, $L_r$, at the opposite ends of which are the filters, 18 and 20, both of which are structured to provide feedback to the gain cavity of laser 10.

The output of laser 10 depends on the collective optical action attributable to its effective length, $L_r$, the reflectivity characteristics of the filters, 18 and 20, the gain characteristics of the material of which the core 14 is made, and the pump energy level provided by the laser diode 22 or other suitable pump source which has a bright emission at a wavelength which is absorbed by the gain material.

As in other resonant cavity structures, the effective length, $L_r$, determines the frequency or wavelength of the resonances supported in the cavity and is an integral number N of half-wavelengths, i.e., $$L_r = \frac{N\lambda}{2n_e}$$

where $\lambda$ is the free space wavelength and $n_e$ is the effective index of the core 14 at the resonant mode.

The wavelength separation between resonant modes of the cavity is determined by changing the value of N and then subtracting successive possible resonant wavelengths, assuming nearly equal values, to arrive at the following equation for expressing the separation between modes:

$$\Delta\lambda = \lambda^2/2L_r n_e$$

An inspection of this equation reveals that the shorter the resonant cavity, the greater the spacing between resonant modes or between communications channels.

Assuming equal values for the end reflectors and that the cavity losses are due only to these end reflectors, the line spread of each of the resonant orders is given by the following equation:

$$\Delta\lambda_s = \frac{(1-R)\lambda^2}{2 L_r n_e}$$

where R is the value of the end reflectivity and $\Delta\lambda_s$ gives the separation between one-half intensity points of the resonant line.

From this equation, it can be seen that the effect of increasing the resonant cavity length is to reduce the line spread of its resonant orders.

The overall length of the laser can vary by one or more orders of magnitude as desired. For example, a 10 centimeter long laser to produce an output of 1.54 micrometers having an effective index of refraction $n_e = 1.5$, and ends with reflectivities of about 95% will have a free spectral range of 0.08 angstroms and a cavity line spread of 0.0012 angstroms, while a 1 centimeter long laser with the same characteristics would produce a separation between resonant orders of 0.8 angstroms and would have a cavity line width of 0.012 angstroms. However, for reasons to follow, lasers according to the invention can reasonably be expected to range in length from say 0.1 mm to 100 meters or more.

To assist in fabricating the laser end filters, 18 and 20, the optical fiber laser is placed inside of a glass capillary tube 26 and is potted there to remain fixed in place. The ends of this tube, along with the optical fiber 12 are ground and polished and the filters 18 and 20, are then formed on the polished ends in a well-known manner such as by vapor deposition. In this way, the capillary tube 26 both aids in the fabrication of the filters, 18 and 20, and provides a means for easily handling laser 10. For this purpose, the outside diameter of the capillary tube 26 is made to to be several millimeters, or more, for convenience.

Now, as is well known, an atomic medium with an inverted population is capable of amplifying an electromagnetic wave if the latter's frequency falls within the transition line shape. If the laser medium is placed inside an optical resonator, the electromagnetic wave bounces back and forth between the two reflectors and picks up an additional amount of energy on each pass between them. If the amplification exceeds the losses caused by imperfect reflection in the mirrors and scattering or absorption within the laser medium, the energy stored in the resonator will increase with time. This causes the amplification constant to decrease as a result of gain saturation. The oscillation level will keep increasing until the saturated gain per pass just equals the losses. At this point, the net gain per pass is unity and no further increase in the radiation intensity is possible.

Mathematically, for laser 10, this reduces to:

$$R_{18} R_{20} e^{-(\alpha-\beta)L_r} = 1$$

where $R_{18}$ and $R_{20}$ are the reflectivities of the filters, 18 and 20, respectively; $\alpha$ is the loss (absorption plus scattering) coefficient of the laser core material; and the gain constant.

Although there are a number of material systems that have been used to achieve the necessary laser condition, it is preferable that the lasing medium consisting of just erbium oxide is preferably within the range from 0.01 to 1 weight percent, high enough for suitable output, but not so high as to make it difficult with available pump sources to get inversion of the erbium ion population because it is a three level system. Therefore, the maximum concentration places a limit on the overall minimum cavity length for a given pump power, and this will be on the order of a few millimeters.

Figure 3:
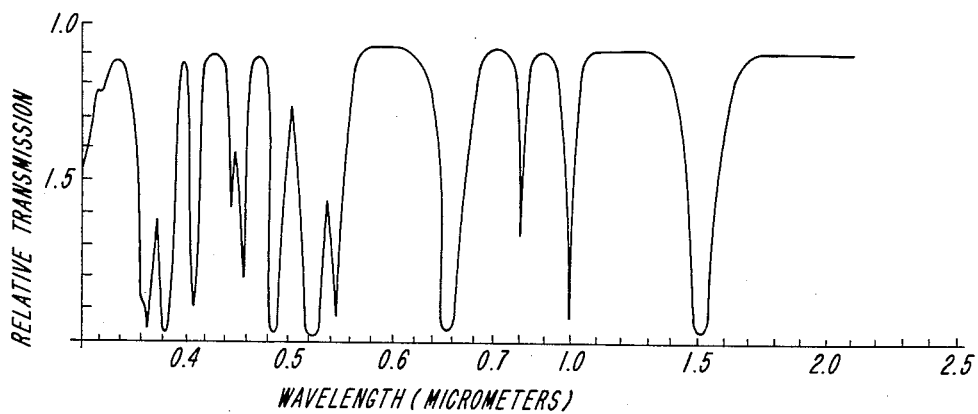
FIG. 3 is a graph illustrating the absorption spectrum of erbium oxide employed in the laser of the invention as the laserable material.
Figure 4:
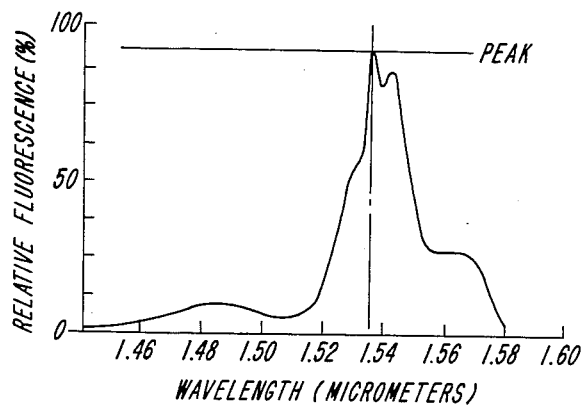
FIG. 4 is a graph illustrating the relative fluorescent spectrum as a function of wavelength for erbium oxide in a silicate glass.
Figure 5:
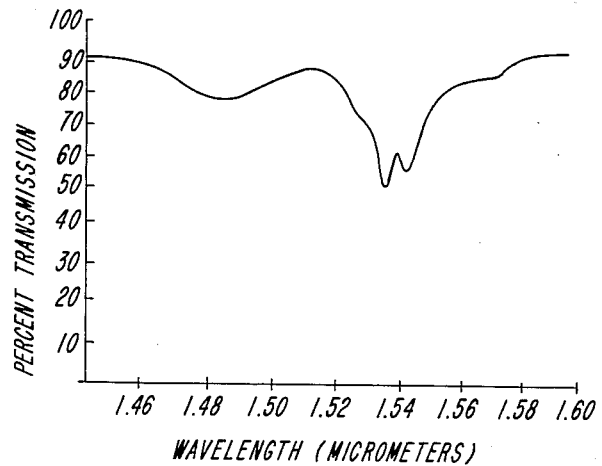
FIG. 5 is a more detailed graph in the region of 1.44 to 1.60 micrometers of the absorption spectrum of erbium oxide employed in the laser of the invention as the laserable material.

The absorption spectra for erbium oxide is given in FIGS. 3 and 5 while its relative fluorescence or emission spectrum is shown in FIG. 4 where it can be seen that there is a peak fluorescent output line at a wavelength of 1.54 micrometers. This is the preferred output wavelength for the laser 10 because it is at the wavelength for lowest attenuation for optical fibers.

As will be appreciated by observing FIG. 4, it can be seen that the relative fluorescence spectrum of the core material is quite broad in bandwidth. This is characteristic of a gain material incorporated in a glass base or host material and is a consequence of the amorphous structure of the glass. It is referred to in the art as inhomogeneous broadening and results at least in part because each ion of the laser material does not experience exactly the same environment within the host material.

To arrive at the pump power requirement to meet the laser threshold condition, consideration must be given to the pump power to produce an inversion of population, i.e., more ions in the excited state than in the ground state.

To arrive at the pump power requirement to meet the laser threshold condition, consideration must be given to the amount of pump energy absorbed in traversing the length of the fiber core 14. This depends on the absorption coefficient $\alpha_p$ for erbium at the pump wavelength, the length of the core 14, and the concentration of erbium present in the core. Performance should be satisfactory where the intensity of the pump power introduced through the filter 20 is reduced by a factor of two after one length and by a factor of four after travelling two lengths. For one length, this is expressed mathematically by $$e^{-\alpha_p K L_r} = 2$$

where $\alpha_p$ = absorption coefficient per unit concentration at the pump wavelength, K = concentration of erbium oxide, and $L_r$ = the core length. The exact attenuation factor is not so important here as the need to absorb most of the energy from the pump (say at least ten percent), but still not have the laser so long that inversion in population over the whole length is not obtained.

FIG. 5 gives the absorption spectrum for 2.5 weight perent $Er_2O_3$ in silicate glass for a sample thickness of 7 millimeters. The absorption band is for the $Er^{+3}$ transition from the $^4I_{15/2}$ round state to the first excited state labeled $^4I_{13/2}$.

Knowing the concentration length product, the number of ions in the core 14 can easily be obtained since its volume is known. With this information, those skilled in the art will appreciate how to obtain the total number of ions needed to be pumped above threshold for laser action at the peak emission line, taking into account coupling losses. This, of course, depends on the lifetime for erbium ions and on the fact that erbium is a three level laser material. In making these calculations, one may make good estimates by assuming the fluorescent lifetime of erbium ions to be equal to 14 milliseconds, that in excess of one-third to one-half of the ion population needs to be in the excited state, that the number of ions per weight percent is equal to $9 \times 10^{19}$ ions/cc, and that the energy per incident photon is equal to $1.33 \times 10^{-19}$ joules.

The incremental small signal gain for an added pump power W above that necessary to achieve zero inversion can be taken to be equal to:

$$\text{Gain (db)} = 4.3 \frac{W \sigma \tau}{A h \nu_p}$$

where W = pump power in watts, $\sigma$ = gain cross-section per ion, $\tau$ = fluorescent lifetime, A = core area, h = Planck's constant, and $\nu_p$ = pump frequency. For a gain cross-section per ion of $0.5 \times 10^{-20} cm^2$ for erbium, an area for the core of $8 \times 10^{-8} cm^2$, and a pump wavelength of 1.49 micrometers, the gain would be equal to $28 \times$ the pump power, W in milliwatts. This gain then would have to overcome losses for laser action.

As will be appreciated, the conversion of pump energy to laser gain above threshold is quite good for erbium end pumped in this manner, being about an order of magnitude better than a comparable neodymium laser. This is believed to be a consequence of the longer fluorescence lifetime of erbium, its narrower line width, and the small energy shift from the pump wavelength to the laser wavelength.

Laser diode 22 is preferably a well-known indium gallium arsenide phosphide type with a spectral output at approximately 1.49 micrometers, an emission restricted to a wavelength interval of less than 300 angstroms. Its power level is regulated by controlling its injection current, and the bulk optics 24 are preferably chosen to match the NA of the laser diode 22 to the NA of the optical fiber 12 which is approximately 0.3, for example. Thus, these components represent a means by which it is possible to controllably couple energy into the fiber core 12 to cause the required population inversion above threshold to provide lasing action in the cavity. As will be appreciated by observing FIG. 3, the spectral line output of the laser diode 22 occurs at one of the absorption bands for the material in the region of 1.45 to 1.53 micrometers.

One example laser has been calculated as satisfactory for pump power in fractions of a watt and was a 10 centimeter long single mode optical fiber with a core with approximately 1 weight percent of erbium oxide incorporated in a silicate glass. This gives an absorption at 1.49 micrometers of 6%/cm. For one-half the ions in the excited state and an area of $8 \times 10^{-8} cm^2$, the required pump power for this condition of zero inversion is 1.2 milliwatts.

Those skilled in the art may practice the invention in other ways in accordance with its teachings and still be within its scope. Therefore, it is intended that all matter contained in the above description or shown in the accompanying drawings shall be interpreted as illustrative and not in a limiting sense.

What is claimed is:

1. An optical fiber laser comprising:

a gain cavity including a single mode optical fiber of given length and index of refraction and a cladding surrounding said core and having an index of refraction lower than that of said core, said core comprising a host material having incorporated therein a predetermined concentration of just erbium oxide having a fluorescence spectrum with a peak emission line at 1.54 micrometers;

filter means optically coupled to each end of said fiber gain cavity for providing feedback in said cavity at said peak emission line of said erbium oxide and for permitting energy to be introduced into said cavity at the absorption band of said erbium oxide in the region of 1.45 to 1.53 micrometers; and a laser diode optically coupled to one end of said core for pumping energy into said end of said gain cavity so that said gain cavity oscillates at just said peak emission line.

2. The laser of claim 1 wherein the concentration of said erbium oxide in said host material does not exceed 5 weight percent.

3. The laser of claim 1 wherein the concentration of said erbium oxide in said host material is within the range including 0.01 and 1.0 weight percent.

4. The laser of claim 1 wherein the concentration of said erbium oxide and the length of said gain cavity are selected so that at least ten percent of the energy from said laser diode is absorbed in one round trip measured from the end of said gain cavity through which it is introduced.

5. The laser of claim 1 wherein the concentration of said erbium oxide and the length of said gain cavity are selected so that said gain cavity attenuates radiation by a factor of 2 in traveling one length of said gain cavity.

* * * * *